United States Patent
Yokose et al.

(10) Patent No.: US 11,797,553 B2
(45) Date of Patent: Oct. 24, 2023

(54) TIMELINE DISPLAY DEVICE, TIMELINE DISPLAY METHOD AND TIMELINE DISPLAY PROGRAM

(71) Applicant: Nippon Telegraph and Telephone Corporation, Tokyo (JP)

(72) Inventors: Fumihiro Yokose, Musashino (JP); Kimio Tsuchikawa, Musashino (JP); Sayaka Yagi, Musashino (JP); Yuki Urabe, Musashino (JP); Takeshi Masuda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/617,087

(22) PCT Filed: Jun. 10, 2019

(86) PCT No.: PCT/JP2019/022993
§ 371 (c)(1),
(2) Date: Dec. 7, 2021

(87) PCT Pub. No.: WO2020/250288
PCT Pub. Date: Dec. 17, 2020

(65) Prior Publication Data
US 2022/0229839 A1 Jul. 21, 2022

(51) Int. Cl.
*G06F 16/00* (2019.01)
*G06F 16/2458* (2019.01)
(Continued)

(52) U.S. Cl.
CPC ........ *G06F 16/2477* (2019.01); *G06F 3/0481* (2013.01); *G06F 16/2228* (2019.01);
(Continued)

(58) Field of Classification Search
CPC .. G06F 16/26; G06F 16/2477; G06F 16/2228; G06F 3/0481; G06T 11/206; G06Q 10/10; G06Q 10/1091
(Continued)

(56) References Cited

U.S. PATENT DOCUMENTS 6,195,497 B1 * 2/2001 Nagasaka ............... H04N 21/84
386/200
6,901,303 B2 * 5/2005 Larson .................... G06F 11/24
714/E11.154
(Continued)

FOREIGN PATENT DOCUMENTS

| JP | 2010128916 | 6/2010 |
| JP | 2012-085000 | 4/2012 |

(Continued)

OTHER PUBLICATIONS

Yagi et al., "A Visualization Technique of Multiple Window Usage for Operational Process Understanding," IEICE Technical Report, Nov. 2018, 118(303):27-32, 16 pages (with Machine Translation).

*Primary Examiner* — Vincent F Boccio
(74) *Attorney, Agent, or Firm* — Fish & Richardson P.C.

(57) ABSTRACT

A timeline display device includes processing circuitry configured to store event data for displaying a figure that represents an operation along a time axis, the event data including a start time point and an end time point of the operation, acquire a search condition that specifies an appearance pattern of the figure that is displayed, and search for data pieces of the event data that match the acquired search condition.

9 Claims, 14 Drawing Sheets

(51) Int. Cl.
*G06F 16/26* (2019.01)
*G06F 16/22* (2019.01)
*G06T 11/20* (2006.01)
*G06F 3/0481* (2022.01)
*G06Q 10/1091* (2023.01)

(52) U.S. Cl.
CPC ............ *G06F 16/26* (2019.01); *G06T 11/206* (2013.01); *G06Q 10/1091* (2013.01)

(58) Field of Classification Search
USPC ......................................................... 707/746
See application file for complete search history.

(56) References Cited

U.S. PATENT DOCUMENTS

| | | | |
|---|---|---|---|
| 2010/0161827 A1* | 6/2010 | Griesmer | H04L 12/2869 709/232 |
| 2012/0011439 A1* | 1/2012 | Karn | G06F 11/3414 715/704 |
| 2012/0087636 A1 | 4/2012 | Kudo | |
| 2013/0159902 A1* | 6/2013 | Kwak | G06F 3/0488 715/765 |
| 2016/0098234 A1* | 4/2016 | Weaver | G06F 3/121 358/1.15 |
| 2016/0107063 A1 | 4/2016 | Watanabe et al. | |
| 2017/0302998 A1 | 10/2017 | Nagasaka et al. | |

FOREIGN PATENT DOCUMENTS

| | | |
|---|---|---|
| JP | 2015-016289 | 1/2015 |
| JP | 2015-106208 | 6/2015 |
| WO | WO 2016051965 | 4/2016 |

\* cited by examiner

Fig. 2

| START TIME POINT | END TIME POINT | WINDOW HANDLE | WINDOW TITLE | exe NAME | URL/PASS NAME | WINDOW STATE | WINDOW EXPOSURE LEVEL |
|---|---|---|---|---|---|---|---|
| 2018/9/25 10:15:23 | 2018/9/25 10:19:10 | 263856 | ORDER LIST | C:¥Program Files¥Internet Explorer¥iexplore.exe | https://sample.com/order-system | inactive | 4 |
| 2018/9/25 10:15:23 | 2018/9/25 10:19:10 | 263856 | ORDER LIST | C:¥Program Files¥Internet Explorer¥iexplore.exe | https://sample.com/order-system | active | 1 |
| 2018/9/25 10:19:10 | 2018/9/25 10:22:08 | 328162 | ORDER DETAILS | C:¥Program Files¥Internet Explorer¥iexplore.exe | https://sample.com/order-system/detail | inactive | 4 |
| 2018/9/25 10:19:10 | 2018/9/25 10:22:08 | 328162 | ORDER DETAILS | C:¥Program Files¥Internet Explorer¥iexplore.exe | https://sample.com/order-system/detail | active | 1 |
| 2018/9/25 10:19:10 | 2018/9/25 10:22:08 | 263856 | ORDER LIST | C:¥Program Files¥Internet Explorer¥iexplore.exe | https://sample.com/order-system | inactive | 3 |
| 2018/9/25 10:22:08 | 2018/9/25 10:24:44 | 659481 | SPECIAL ORDER LIST.xlsx | C:¥Program Files¥Microsoft Office14¥EXCEL.EXE | C:¥Users¥yagi¥moushikomi¥SPECIAL ORDER LIST.xlsx | inactive | 4 |
| 2018/9/25 10:22:08 | 2018/9/25 10:24:44 | 659481 | SPECIAL ORDER LIST.xlsx | C:¥Program Files¥Microsoft Office14¥EXCEL.EXE | C:¥Users¥yagi¥moushikomi¥SPECIAL ORDER LIST.xlsx | active | 1 |
| 2018/9/25 10:22:08 | 2018/9/25 10:24:44 | 328162 | ORDER DETAILS | C:¥Program Files¥Internet Explorer¥iexplore.exe | https://sample.com/order-system/detail | inactive | 4 |
| 2018/9/25 10:24:44 | 2018/9/25 10:29:01 | 328162 | ORDER DETAILS | C:¥Program Files¥Internet Explorer¥iexplore.exe | https://sample.com/order-system/detail | active | 1 |
| ... | ... | ... | ... | ... | ... | ... | ... |

WINDOW SPECIFYING INFORMATION

| SERIAL NUMBER | APPEARANCE TIME | WINDOW HANDLE | WINDOW TITLE | exe NAME | URL/PASS NAME |
|---|---|---|---|---|---|
| 1 | 227 SECONDS | <NOT SPECIFIED> | ORDER LIST | iexplore.exe | <NOT SPECIFIED> |
| 2 | 178 SECONDS | <NOT SPECIFIED> | ORDER DETAILS | iexplore.exe | <NOT SPECIFIED> |
| 3 | 156 SECONDS | <NOT SPECIFIED> | SPECIAL ORDER LIST.xlsx | EXCEL.EXE | <NOT SPECIFIED> |

TIMELINE DISPLAY DEVICE, TIMELINE DISPLAY METHOD AND TIMELINE DISPLAY PROGRAM

CROSS-REFERENCE TO RELATED APPLICATIONS

This application is a National Stage application under 35 U.S.C. § 371 of International Application No. PCT/JP2019/022993, having an International Filing Date of Jun. 10, 2019. The disclosure of the prior application is considered part of the disclosure of this application, and is incorporated in its entirety into this application.

TECHNICAL FIELD

The present invention relates to a timeline display device, a timeline display method, and a timeline display program.

BACKGROUND ART

Conventionally, PCs that include GUIs (Graphical User Interfaces) based on windows are essential in various business fields, and improvements in efficiency of work that is performed using PCs bring about significant effects. In order to improve efficiency of work performed using a PC, it is effective to initially record and analyze a history of work performed using the PC to clarify problems.

As an example of analysis methods used in such cases, there is a method of visualizing the history in the form of a timeline (see NPL 1). In a display in the form of a timeline (hereinafter referred to as a "timeline display"), elements of an operation history are expressed as laterally elongated rectangles and displayed in a y-axis (or x-axis) direction, taking the x axis (or the y axis) to be a time axis. With the timeline display, it is possible to display the duration of each element and a sequential relationship and a co-occurrence relationship between the elements in an easily understandable manner. Therefore, the timeline display is suitable for qualitative evaluation for intuitively grasping conditions of use of windows.

CITATION LIST

Non Patent Literature

[NPL 1] Sayaka Yagi and three others, "A Visualization Technique of Multiple Window Usage for Operational Process Understanding", IEICE Technical Report, November 2018, vol. 118, no. 303, ICM2018-29, pp. 27-32

SUMMARY OF THE INVENTION

Technical Problem

However, it was difficult to quantitatively analyze conditions of use of windows using conventional technologies. For example, a timeline display is an expression using figures, and accordingly is not suitable for quantitative evaluation such as measurement of a length of time during which a specific pattern occurs or counting of the number of times of the occurrence of a specific pattern. In order to perform quantitative evaluation, it is also possible to directly process an operation history log and calculate a sum of times required or the number of times, for example, without using a timeline display. However, it is not easy to process an operation history log that is a set of "start time points", "end time points", and text information such as information unique to windows, without the aid of a timeline display.

The present invention was made in view of the foregoing, and has an object of making it possible to easily perform quantitative evaluation of conditions of use of windows by using qualitative features that are found.

Means for Solving the Problem

In order to solve the problems described above and achieve the object, a timeline display device according to the present invention includes: processing circuitry configured to: store event data for displaying a figure that represents an operation along a time axis, the event data including a start time point and an end time point of the operation; acquire a search condition that specifies an appearance pattern of the figure that is displayed; and search for data pieces of the event data that match the acquired search condition.

Effects of the Invention

According to the present invention, it is possible to easily perform quantitative evaluation of conditions of use of windows by using qualitative features that are found.

BRIEF DESCRIPTION OF DRAWINGS

FIG. 2 is a diagram showing an example data structure of event data.
FIG. 3 is a diagram showing an example data structure of window specifying information.

DESCRIPTION OF EMBODIMENTS

Figure 1:
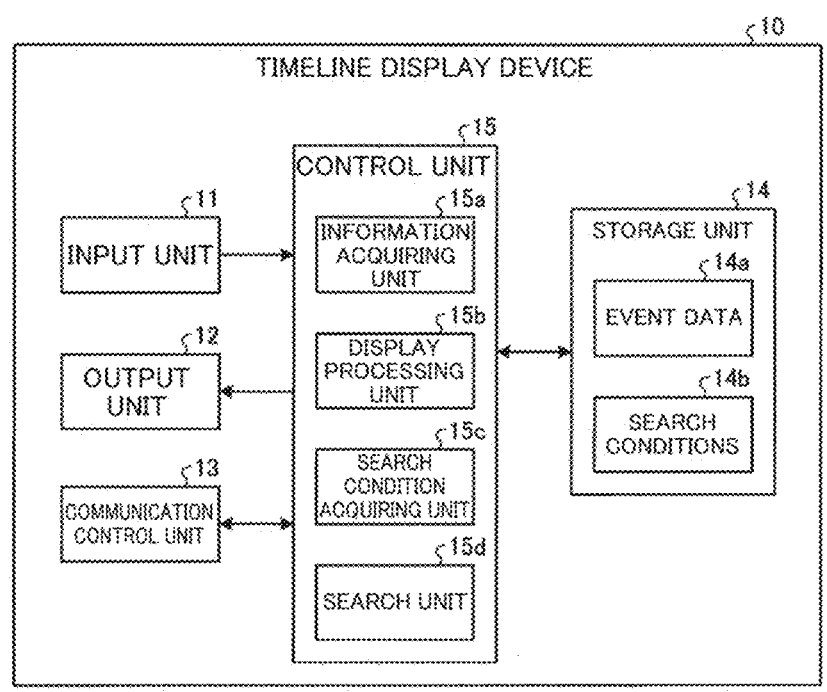
FIG. 1 is a schematic diagram showing an example of a schematic configuration of a timeline display device according to the present embodiment.

The following describes an embodiment of the present invention in detail with reference to the drawings. Note that the present invention is not limited by the embodiment. In the drawings, the same portions are denoted with the same reference signs.

Configuration of Timeline Display Device FIG. 1 is a schematic diagram showing an example of a schematic configuration of a timeline display device according to the present embodiment. As shown in FIG. 1, the timeline display device 10 according to the present embodiment is realized using a general-purpose computer such as a personal computer, and includes an input unit 11, an output unit 12, a communication control unit 13, a storage unit 14, and a control unit 15.

The input unit 11 is realized using an input device such as a keyboard or a mouse, and inputs various types of instruction information such as information for starting processing, to the control unit 15 in response to an input operation made by an operator. The output unit 12 is realized using a display device such as a liquid crystal display, a printing device such as a printer, or the like. For example, a result of timeline display processing, which will be described later, is displayed in the output unit 12.

The communication control unit 13 is realized using a NIC (Network Interface Card) or the like, and controls communication performed between an external device and the control unit 15 via an electrical communication line such as a LAN (Local Area Network) or the Internet. For example, the communication control unit 13 controls communication between the control unit 15 and a management device that manages various types of information regarding.

The storage unit 14 is realized using a semiconductor memory element such as a RAM (Random Access Memory) or a flash memory, or a storage device such as a hard disk or an optical disc. A processing program that causes the timeline display device 10 to operate, data that is used during execution of the processing program, and the like are stored in the storage unit 14 in advance, or the program, data, and the like are temporarily stored in the storage unit 14 every time processing is performed. Note that the storage unit 14 may also be configured to communicate with the control unit 15 via the communication control unit 13.

In the present embodiment, event data 14a, search conditions 14b, and the like are stored in the storage unit 14. These types of information are stored in the storage unit 14 in advance of the timeline display processing described later. Note that these types of information do not necessarily have to be stored in the storage unit 14 and may also be acquired when the timeline display processing described later is executed, for example. In this case, an information acquiring unit 15a, which will be described later, may acquire an operation history log and generate the event data 14a in advance of processing performed by a display processing unit 15b and a search unit 15d. Also, a search condition acquiring unit 15c may acquire the search conditions 14b via the input unit 11 or the communication control unit 13 in advance of processing performed by the search unit 15d.

The event data 14a is data for displaying a figure that represents an operation along a time axis, and includes a start time point and an end time point of the operation. For example, the event data 14a is data for performing timeline display of an operation history log. The event data 14a is generated using an operation history log that is acquired by the information acquiring unit 15a, which will be described later, from an information terminal operated by a user or a management device that manages the operation history log of the information terminal, for example. Then, the display processing unit 15b, which will be described later, processes the event data 14a, and the output unit 12 performs timeline display of figures representing operations along the time axis.

FIG. 2 is a diagram showing an example data structure of event data. As shown in FIG. 2, each row of the event data 14a includes information such as a "start time point", an "end time point", a "window handle", a "window title", an "exe name", a "URL/pass name", a "window state", and a "window exposure level". Note that the event data only includes information regarding windows that are displayed on a screen, and does not include information regarding a window that is minimized.

Here, the size of a figure that represents an operation in a timeline display is specified along a time axis by the "start time point" and the "end time point". Also, a window that is the target of the operation is specified by the "window title", the "exe name", and the "URL/pass name".

The "window state" indicates whether the window is in an active state or in an inactive state. Here, the "active state" refers to the state of a window that accepts an input operation made via a mouse, a keyboard, or the like in a PC that includes a GUI based on windows. The "inactive state" refers to the state of a window that is not in the active state.

The "window handle" is a numerical value for distinguishing a window or an object on a screen, and changes every time the window is generated. The "window exposure level" indicates a ratio of an exposed portion of the window on the screen, excluding portions in which a plurality of windows overlap and portions that are out of the screen.

The description will be continued again referring to FIG. 1. The search conditions 14b are conditions for specifying targets of processing performed by the search unit 15d, which will be described later, and are acquired by the search condition acquiring unit 15c, which will be described later, via the input unit 11 or the communication control unit 13. The search conditions 14d include information that specifies an appearance pattern of figures that are displayed and represent operations. Specifically, the search conditions 14b include a display state, a search mode, window specifying information, a time matching ratio, and an allowed interval.

The display state is information that specifies targets of processing performed by the search unit 15d described later, as being only windows in the active state or including windows in the inactive state.

Here, in a case where a plurality of windows are simultaneously displayed in a PC, only one window is in the active state at a time. A user operates the PC while switching a window in the inactive state to the active state.

If the display state is "Yes", only windows in the active state are targets of a search, and if the display state is "No", both windows in the active state and windows in the inactive state are targets of a search.

The search mode is information that specifies a processing method performed by the search unit 15d described later, and an order mode, a ratio mode, and an existence mode are defined. The order mode is a processing method for carrying out a search according to an order in which a figure representing an operation appears. The ratio mode is a processing method for carrying out a search according to a ratio of an appearance time of a figure. The existence mode is a processing method for carrying out a search according to a plurality of figures that appear at the same time point.

Note that, if the display state is "Yes", i.e., if only windows in the active state are targets of a search, either the order mode or the ratio mode can be selected. If the display state is "No", i.e., if windows in the inactive state are included in targets of a search, the existence mode can be selected.

The window specifying information is information that specifies windows that are targets of a search out of windows that are displayed in a timeline display. FIG. 3 is a diagram showing an example data structure of the window specifying information. As shown in FIG. 3, each row of the window specifying information includes information of a "serial number", an "appearance time", a "window handle", a "window title", an "exe name", and a "URL/pass name".

Here, the "serial number" is an item that indicates an appearance order of the window of each row, and is specified only when the search mode is the order mode. The "appearance time" is an item that indicates the duration of display of the window of the corresponding row, and is specified when the search mode is the order mode or the ratio mode.

If values of the "window handle", "window title", "exe name", and "URL/pass name" are not specified, it is assumed that any values in the event data 14a match in processing performed by the search unit 15d described later. Partial matching is performed with respect to specified values.

Note that a value that changes every time a window is generated, such as the "window handle" for distinguishing a window or an object on a screen, is not useful as a search condition, and therefore a configuration is also possible in which such a value is not included in the window specifying information.

The window specifying information shown in FIG. 3 specifies an appearance pattern of windows that are targets of a search in the order mode. That is, it is specified that first, a window of which the exe name includes a character string "iexplore.exe" and the window title includes a character string "order list" is displayed for 227 seconds. It is specified that next, a window of which the exe name includes the character string "iexplore.exe" and the window title includes a character string "order details" is displayed for 178 seconds. It is specified that next, a window of which the exe name includes a character string "EXCEL.EXE" and the window title includes a character string "special order list.xlsx" is displayed for 156 seconds.

The description will be continued again referring to FIG. 1. The time matching ratio is time matching information that specifies a range in which it is determined that an appearance time of a figure representing an operation matches with the event data 14a. To what extent the appearance time is strictly considered is determined by the time matching ratio. For example, in the example shown in FIG. 3, the window specifying information of serial number "1" specifies a window of which the appearance time is 227 seconds, but there is almost no meaning in searching for event data of which the appearance time is exactly 227 seconds, and therefore a search is carried out setting a predetermined time width using the time matching ratio.

For example, if the time matching ratio is 1.0, only event data 14a of which the appearance time exactly matches is searched for. On the other hand, if the time matching ratio is 0.0, the appearance time is not taken into consideration as a search condition. If the time matching ratio is an intermediate value excluding 1.0 and 0.0, event data 14a that matches is searched for within a time range (a matching time range) that has a lower limit of "appearance time"×"time matching ratio" and an upper limit of "appearance time"÷"time matching ratio". For example, if the time matching ratio is 0.5, event data 14a is searched for within a range from 113.5 seconds to 454 seconds with respect to the appearance time of 227 seconds.

Note that the relationship between the time matching ratio and the matching time range is not limited to the relationship described above. For example, the relationship may also be defined using a predetermined function. Alternatively, different time matching ratios may also be applied to the upper limit and the lower limit. Alternatively, matching times may also be specified instead of the time matching ratio. The time matching ratio may also be presented to the user as a percentage.

The allowed interval is interval information that specifies the range of a time interval that is allowed when a plurality of figures representing operations are switched. The allowed interval is effective in a case where the search mode is the order mode or the ratio mode.

For example, when the user switches a window A to a window B, there may be a case where the window A is not directly switched to the window B, such as a case where the switching is performed via a window C without particular meaning in the work or a case where all windows are temporarily closed. Therefore, a width (an allowable range) is set for the time interval (interval time) of switching between windows. The allowed interval refers to this allowable range.

For example, in a case where a pattern in which the window A is switched to the window B is searched for with the allowed interval set to 5 seconds, it is determined that the window A is switched to the window B if the switching from the window A to the window B is performed in 5 seconds.

Note that two or more allowed intervals that are specified in a case where switching between three or more windows is searched for may be the same value or different values. The allowed interval may be expressed in seconds as described above, or expressed as a ratio to a display time of windows that are searched for. For example, the allowed interval of switching from the window A to the window B may be defined as 0.1. In this case, when the window B is displayed for 20 seconds after the window A is displayed for 40 seconds, it is determined that the window A is switched to the window B if the window B is displayed in a time of which a ratio to the display time of 60 seconds is no greater than 0.1, i.e., in 6 seconds.

The control unit 15 is realized using a CPU (Central Processing Unit) or the like, and executes a processing program that is stored in a memory. Thus, the control unit 15 functions as the information acquiring unit 15a, the display processing unit 15b, the search condition acquiring unit 15c, and the search unit 15d as shown in FIG. 1. Note that these functional units or portions of these functional units may also be implemented in different pieces of hardware. Also, the control unit 15 may include another functional unit.

The information acquiring unit 15a acquires an operation history log from an information terminal operated by the user, a management device that manages the operation history log of the information terminal, or the like via the input unit 11 or the communication control unit 13, generates event data 14a using the acquired operation history log, and stores the event data 14a in the storage unit 14. Note that the information acquiring unit 15a may also transfer the generated event data 14a to the display processing unit 15b and the search unit 15d without storing the event data 14a in the storage unit 14, as described above.

The display processing unit 15b processes the event data 14a so that the output unit 12 displays figures representing operations along the time axis. Specifically, the display processing unit 15b processes the event data 14a using predetermined display setting information that specifies a displayed state in a timeline display, for example, a figure, such as a rectangle, that represents an operation, an arrangement order, a color, and grouping, and outputs the processed event data 14a to the output unit 12. The output unit 12 draws the timeline display of the processed event data 14a. Note that the display setting information is input to the timeline display device 10 via the input unit 11 or the communication control unit 13.

The search condition acquiring unit 15c acquires the search conditions 14b specifying an appearance pattern of displayed figures representing operations. The search condition acquiring unit 15c accepts input of the search conditions 14b via the input unit 11 or the communication control unit 13 and stores the search conditions 14b in the storage unit 14. Note that the search condition acquiring unit 15c may also transfer the acquired search conditions 14b to the search unit 15d without storing the search conditions 14b in the storage unit 14, as described above.

The search condition acquiring unit 15c may also interactively accept input of the search conditions 14b from the user. In this case, the user can easily input the search conditions 14b.

Figure 4:
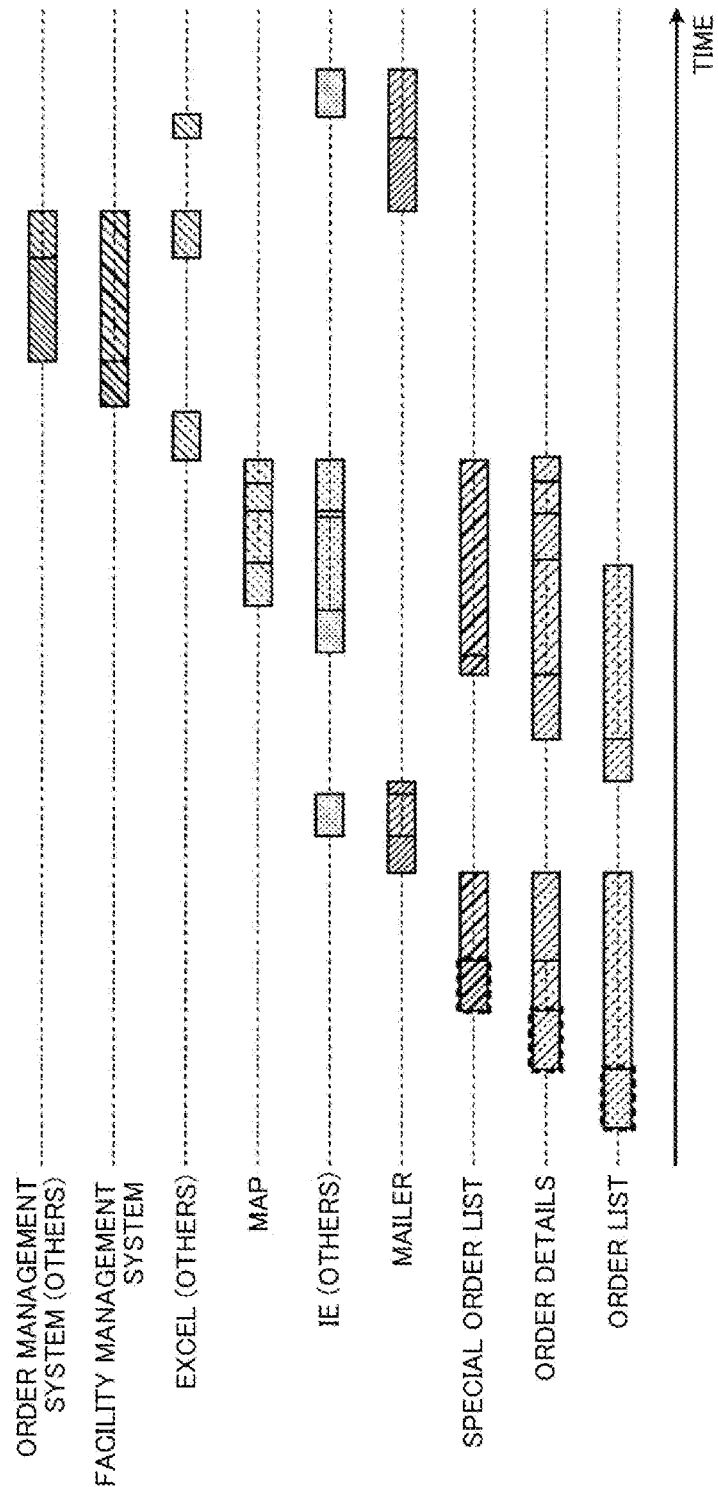
FIG. 4 is a diagram for describing processing performed by a search condition acquiring unit.

For example, FIG. 4 is a diagram for describing processing performed by the search condition acquiring unit. As shown in FIG. 4, the search condition acquiring unit 15c may also interactively accept input of the window specifying information from the user. In the example shown in FIG. 4, information regarding windows that are set in the window specifying information is specified as a result of the user selecting rectangles on the timeline using a mouse or the like, as indicated by bold dash lines surrounding the rectangles. Thus, the search condition acquiring unit 15c accepts a user operation made on the timeline display and automatically inputs the window specifying information.

Alternatively, in order to reduce labor of specifying search conditions, the search condition acquiring unit 15c may also accept input of the search conditions 14b in the form of a dialog using a wizard function that is specialized for a specific search object. For example, the search condition acquiring unit 15c prepares a wizard that accepts input to the search conditions 14b, setting "transition of specific windows" as the search object. In this wizard, the search condition acquiring unit 15c sets window specifying information by making the user select windows in the active state in the timeline display in the order of transition that is to be searched for, and fixes the other conditions of the search conditions 14b. For example, the search condition acquiring unit 15c sets the display state to Yes (only active), sets the search mode to the order mode, sets the time matching ratio to 0.0, and sets the allowed interval to 5 seconds. Thus, search conditions 14b for searching for time ranges in which the active-state windows transition are set.

Alternatively, the search condition acquiring unit 15c prepares a wizard that accepts input to the search conditions 14b, setting "usage ratio of a specific window" as the search object. In this wizard, the search condition acquiring unit 15c sets window specifying information by making the user select a window in the active state that is to be searched for, in the timeline display, and fixes the other conditions of the search conditions 14b. For example, the search condition acquiring unit 15c sets the display state to Yes, sets the search mode to the ratio mode, sets the time matching ratio to 0.5, and sets the allowed interval to 5 seconds. Thus, search conditions 14b for searching for time ranges in which the active-state window is used at a predetermined ratio are set.

Alternatively, the search condition acquiring unit 15c prepares a wizard that accepts input to the search conditions 14b, setting "periods in which windows are frequently switched" as the search object. In this wizard, the search condition acquiring unit 15c makes the user input the number of times of switching between windows to set window specifying information that includes rows of the same number as the input number of times. At this time, the search condition acquiring unit 15c does not specify the "window handle", "window title", "exe name", and "URL/pass name" so that every type of window matches the information. Also, the search condition acquiring unit 15c sets an appropriate appearance time (e.g., 30 seconds) as the "appearance time", according to a predetermined number of seconds in the active state based on which a window is considered as being used. Also, the search condition acquiring unit 15c fixes the other conditions of the search conditions 14b. For example, the search condition acquiring unit 15c sets the display state to Yes, sets the search mode to the order mode, sets the time matching ratio to 0.5, and sets the allowed interval to 5 seconds. Thus, search conditions 14b for searching for time ranges in which windows are frequently switched are set.

The description will be continued again referring to FIG. 1. The search unit 15d searches for event data 14a that matches acquired search conditions 14b. Specifically, the search unit 15d compares event data 14a and the window specifying information and specifies time ranges (matched time ranges) that match an appearance pattern of windows specified by the search conditions 14b.

At this time, the search unit 15d carries out the search in the event data 14a by using partial match conditions with respect to columns specified in the window specifying information. Note that the search unit 15d does not necessarily have to carry out the search using partial match conditions, and may also carry out the search using conditions that are specified by a more advanced regular expression or the like.

The search unit 15d carries out the search according to an order in which a figure representing an operation appears, a ratio of an appearance time of a figure, or a plurality of figures that simultaneously appear at the same time point. That is, the search unit 15d executes search processing in the order mode, the ratio mode, or the existence mode according to the specified search mode. Examples of procedure details of the respective search modes will be described later.

Figure 5:
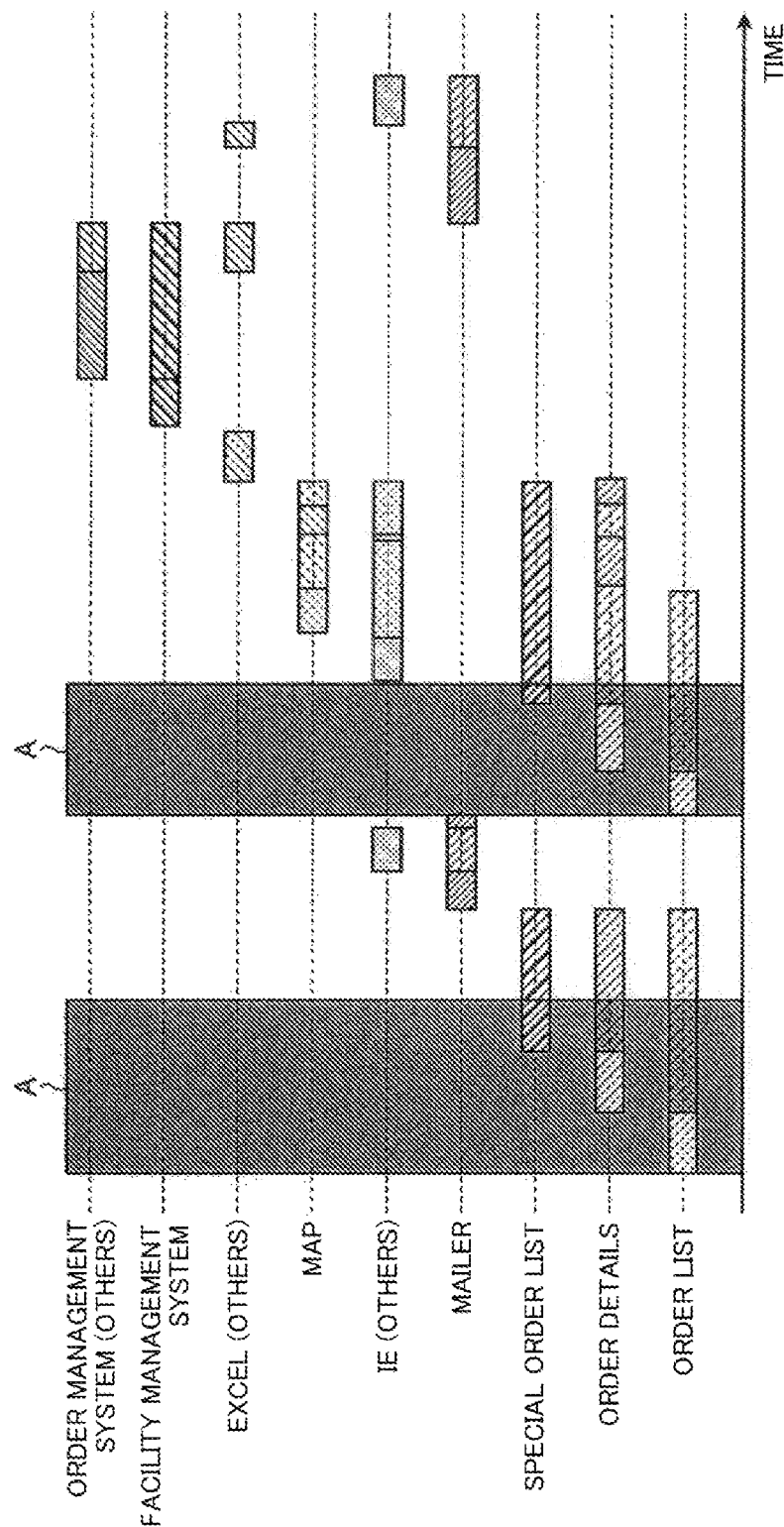
FIG. 5 is a diagram showing an example display of search results on a screen.

The search unit 15d outputs search results to the output unit 12. For example, the search unit 15d displays matched time ranges that are specified. FIG. 5 is a diagram showing an example display of search results on a screen. The search unit 15d displays matched time ranges of the event data 14a that match the search conditions 14b on the timeline display as indicated by regions A in FIG. 5. Additionally, information regarding the matched time ranges is configured to be also displayed as text information using tooltips or the like. As a result, the user can easily perform quantitative evaluation of conditions of use of windows, such as a time or the number of times of a window display pattern on which the user focuses in the timeline display.

Figure 6:
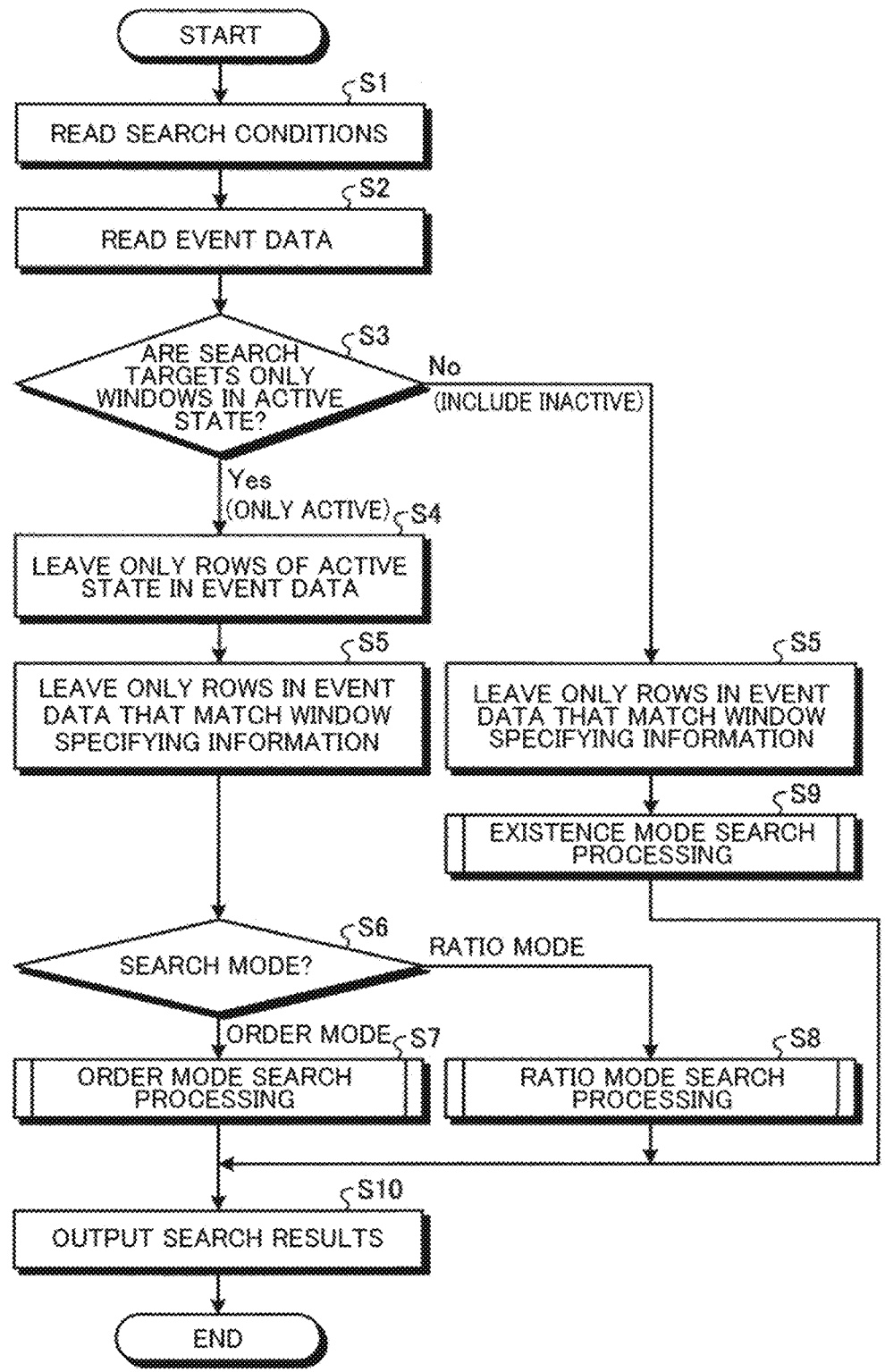
FIG. 6 is a flowchart showing a timeline display processing procedure.

Timeline Display Processing Next, timeline display processing performed by the timeline display device 10 according to the present embodiment will be described with reference to FIG. 6. FIG. 6 is a flowchart showing a timeline display processing procedure. The flowchart shown in FIG. 6 is started when an operation is input by the user to give an instruction to start the procedure, for example.

First, the search unit 15d acquires event data 14a and search conditions 14b (steps S1 to S2). Then, the search unit 15d refers to the search conditions 14b and checks whether the display state of search targets only indicates windows in the active state or includes windows in the inactive state (step S3).

If the display state of search targets only indicates windows in the active state (Yes in step S3), the search unit 15d only leaves rows of windows in the active state in the event data 14a (step S4). Also, the search unit 15d only leaves rows in the event data 14a that match windows that are specified in respective rows of the window specifying information of the search conditions 14b (step S5).

Then, the search unit 15d checks the search mode of the search conditions 14b (step S6), and carries out a search in the specified search mode with respect to the event data 14a that has been extracted as the target of processing in step S5. That is, if the search mode is the order mode, the search unit 15d carries out the search in the order mode (step S7). If the search mode is the ratio mode, the search unit 15d carries out the search in the ratio mode (step S8).

On the other hand, in the processing performed in step S3, if the display state of search targets includes windows in the inactive state (No in step S3), the search unit 15d proceeds to step S5 without performing the processing in step S4 described above. Thereafter, the search unit 15d confirms that the search mode is the existence mode, and carries out a search in the existence mode with respect to the event data 14a that has been extracted as the target of processing in step S5 (step S9).

After carrying out the search of each mode, the search unit 15d outputs search results to the output unit 12 (step S10). Thus, a series of steps of timeline display processing is complete.

Figure 7:
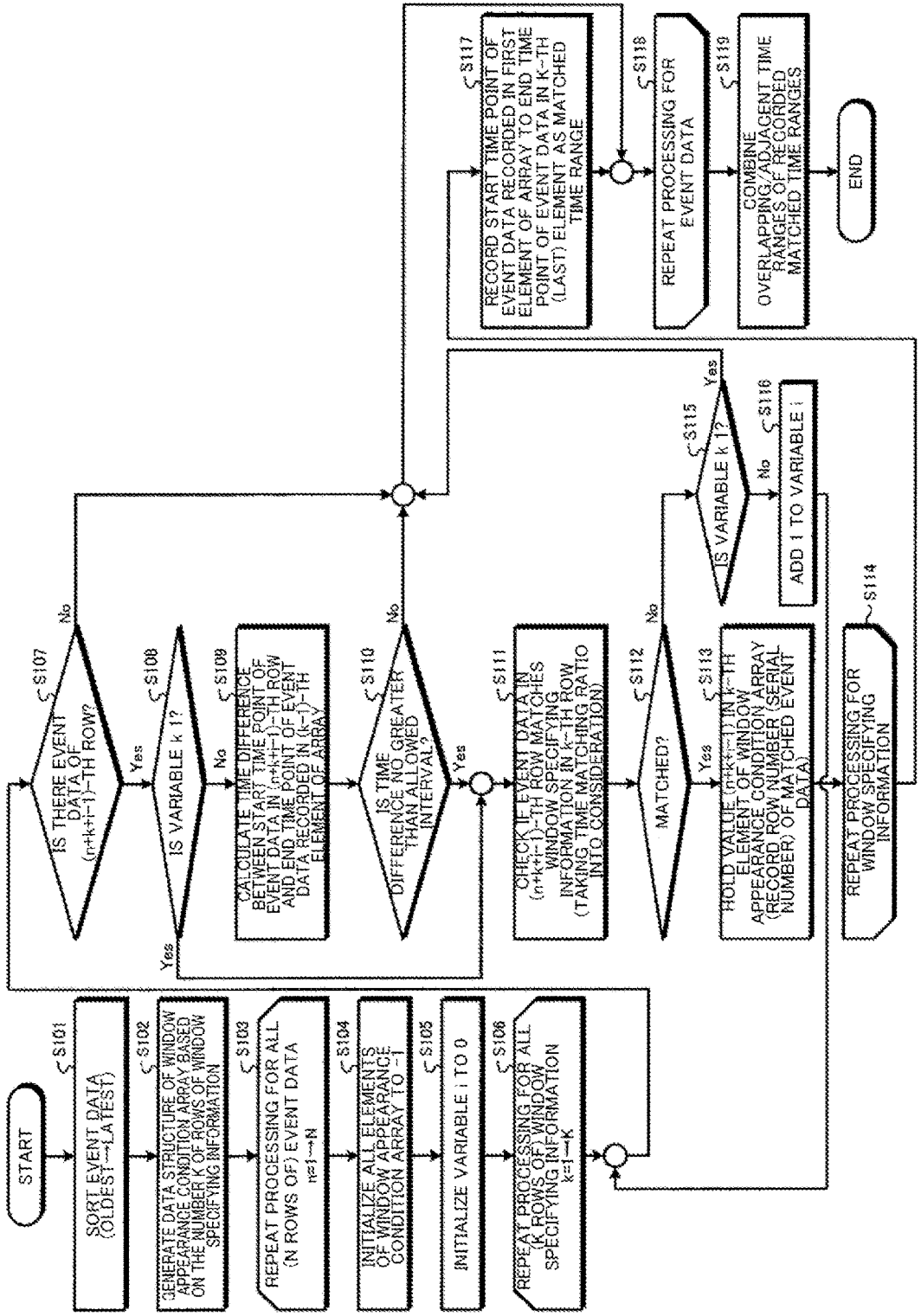
FIG. 7 is a diagram showing a search processing procedure of an order mode.
Figure 8:
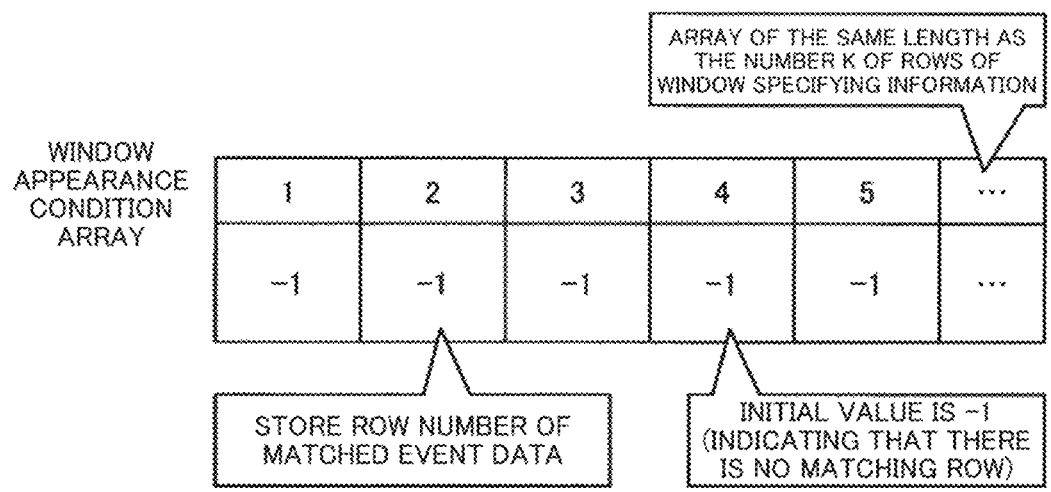
FIG. 8 is a diagram for describing search processing of the order mode.
Figure 9:
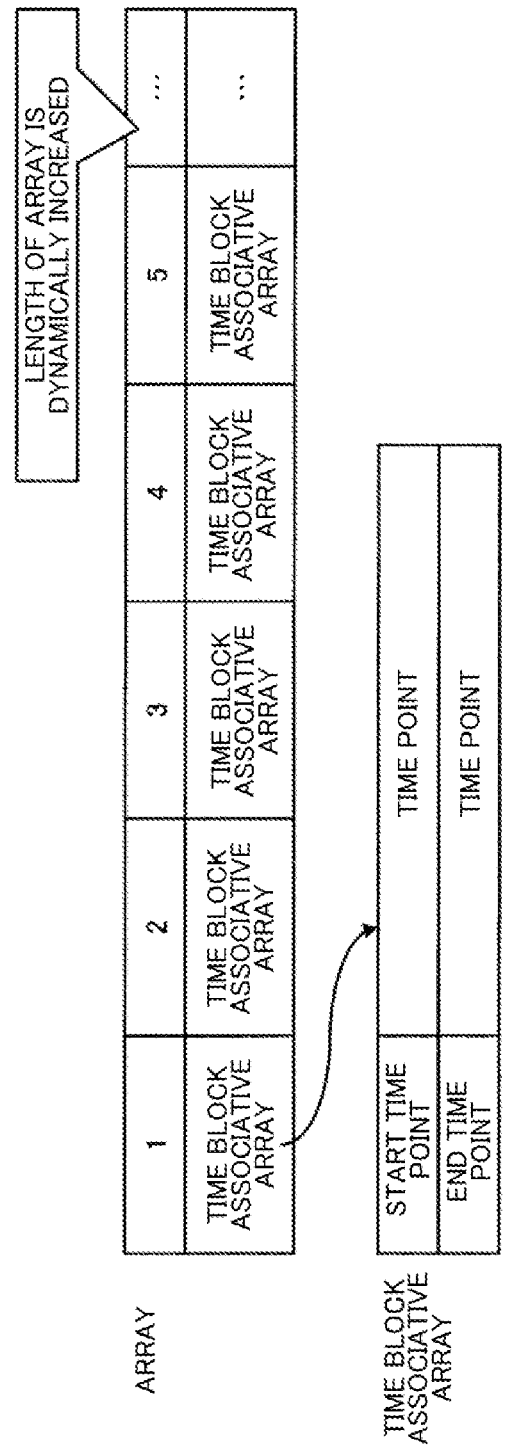
FIG. 9 is a diagram for describing the search processing of the order mode.

Examples Next, examples of search processing will be described with reference to FIGS. 7 to 13. First, FIGS. 7 to 9 are diagrams for describing search processing of the order mode. FIG. 7 shows details of an example processing procedure of the search processing of the order mode (step S7 in FIG. 6). FIG. 8 shows an example data structure of a window appearance condition array that is generated in the search processing of the order mode. FIG. 9 shows an example data structure of matched time ranges that is generated in the search processing.

The search unit 15d sorts processing target event data 14a in order from the oldest to the latest according to time information (step S101). Also, the search unit 15d generates a data structure of a window appearance condition array that has K as a length of the array corresponding to the number K of rows of window specifying information, as shown in FIG. 8 (step S102).

Next, the search unit 15d repeats processing in steps S103 to S118 with respect to data in each row n (n=1 to N) of the event data 14a that includes N rows. First, the search unit 15d initializes the window appearance condition array by setting "−1" that means that "there is no matching row", as an initial value (step S104). Also, the search unit 15d initializes a variable i, which will be described later, to an initial value 0 (step S105). Then, the search unit 15d repeats processing in steps S106 to S114 with respect to information in each row k (k=1 to K) of the window specifying information including K rows.

First, if the event data 14a includes the (n+k+i−1)-th row (Yes in step S107) and the variable k is not 1 (No in step S108), the search unit 15d checks data that is recorded in the (k−1)-th element of the window appearance condition array. Then, the search unit 15d calculates a time difference between the start time point of data in the (n+k+i−1)-th row of the event data 14a and the end time point of data recorded in the (k−1)-th element of the window appearance condition array (step S109). If the calculated time difference is within the range of the allowed interval of the search conditions 14b (Yes in step S110), the search unit 15d proceeds to step S111, and if the calculated time difference is out of the range (No in step S110), the search unit 15d proceeds to step S118.

Note that if the variable k is 1 (Yes in step S108), the search unit 15d proceeds to step S111. Also, if the event data 14a does not include the (n+k+i−1)-th row (No in step S107), the search unit 15d proceeds to step S118.

In processing performed in step S111, the search unit 15d checks whether or not data in the (n+k+i−1)-th row of the event data 14a matches information in the k-th row of the window specifying information. At this time, the search unit 15d takes the time matching ratio of the search conditions 14b into consideration.

If the data matches the information (Yes in step S112), the search unit 15d records the number (n+k+i−1) of the matched row of the event data 14a in the k-th element of the window appearance condition array (step S113), and ends processing with respect to the information in the k-th row of the window specifying information (step S114→step S106). Upon having completed processing with respect to all rows of the window specifying information, the search unit 15d proceeds to step S117.

If the data does not match the information (No in step S112) and the variable k is not 1, the search unit 15d adds 1 to the variable i (No in step S115→step S116), and returns to step S107. If the variable k is 1 (Yes in step S115), the search unit 15d proceeds to step S118. Upon having completed processing with respect to all rows of the window specifying information, the search unit 15d proceeds to step S117.

In processing performed in step S117, the search unit 15d records the start time point of data that is recorded in the first element of the window appearance condition array and the end time point of data that is recorded in the K-th (last) element of the window appearance condition array as a matched time range in the data structure shown in FIG. 9.

Here, as shown in FIG. 9, the matched time range is expressed as an associative array that has a nested structure. The number of arrays is dynamically increased according to the number of matched time ranges, and a start time point and an end time point are recorded in each array.

Upon having completed processing with respect to all rows of the event data (step S118→step S119), the search unit 15d generates search results by combining adjacent time ranges and overlapping time ranges of a plurality of matched time ranges that are recorded (step S119). Thus, a series of steps of search processing of the order mode is complete.

Note that the processing performed in step S119 described above is example processing that is performed when matched ranges found through the search are collectively displayed, but the method for displaying search results is not limited to this example. For example, matched ranges found through the search may also be sequentially displayed. For example, in a case where "mo mo mo" is searched for in a character string "mo mo mo su mo mo mo mo mo no u chi", a matched range "mo mo mo" in the character string is displayed varying the displayed position four times. In this case, the search unit 15d sequentially outputs search results to the output unit 12 without performing the processing in step S119.

Figure 10:
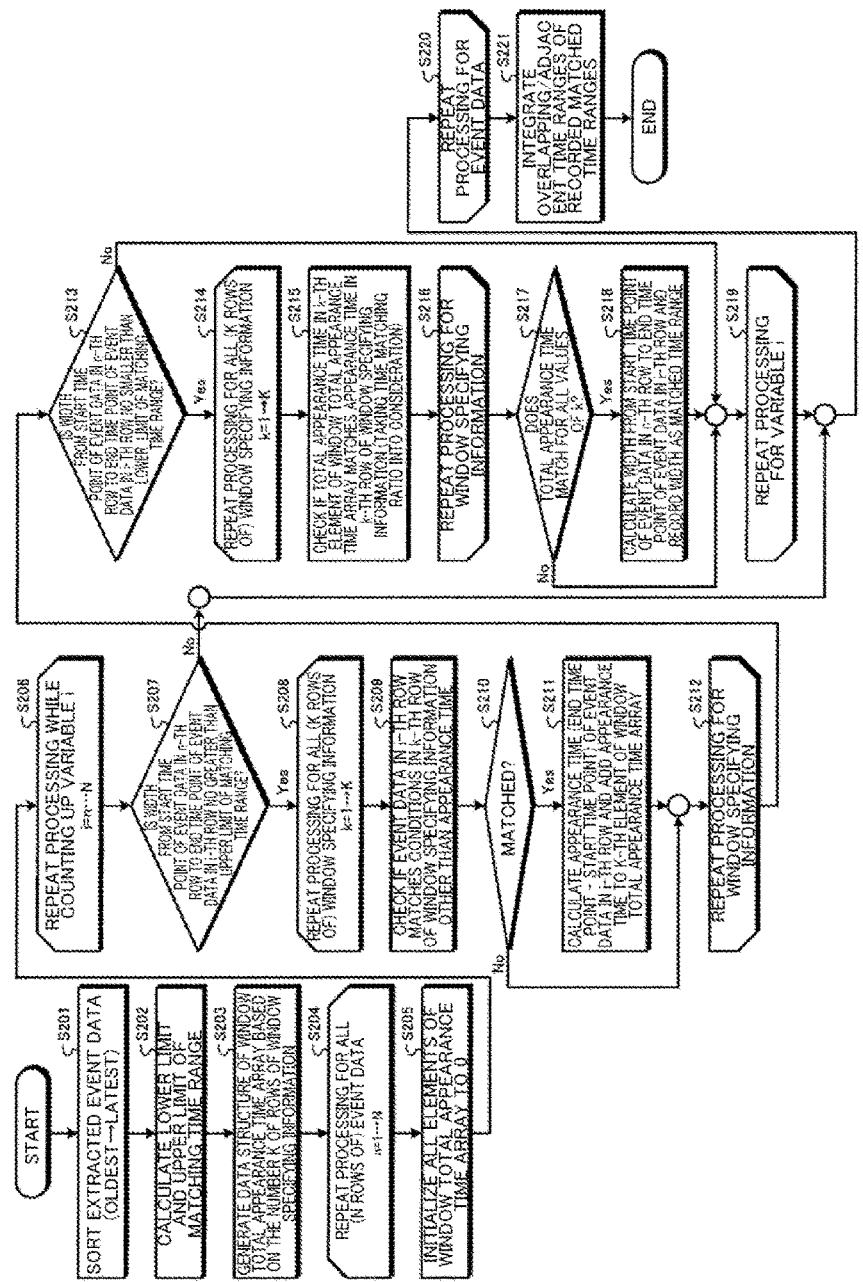
FIG. 10 is a diagram showing a search processing procedure of a ratio mode.
Figure 11:
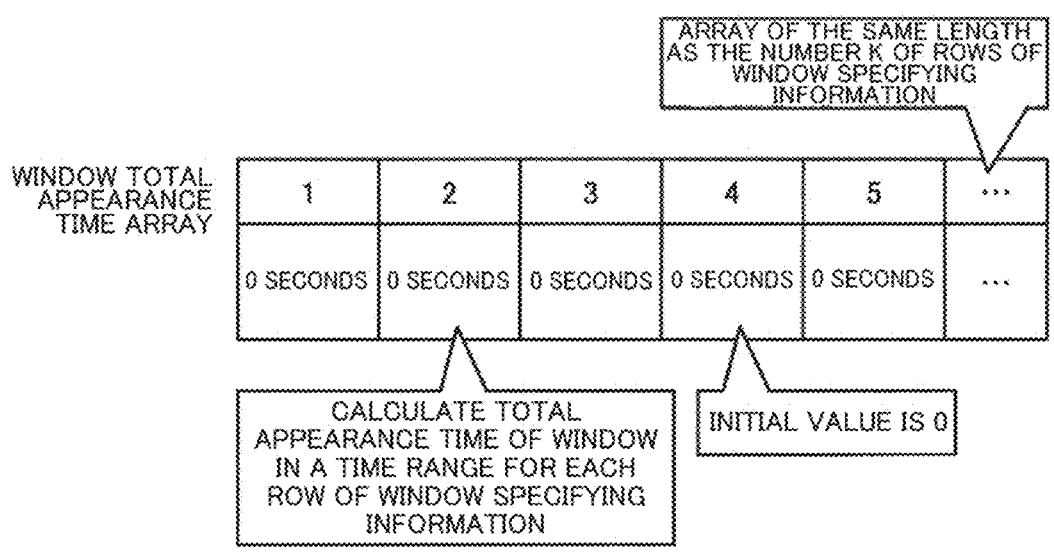
FIG. 11 is a diagram for describing search processing of the ratio mode.

FIGS. 10 and 11 are diagrams for describing search processing of the ratio mode. FIG. 10 shows details of an example processing procedure of the search processing of the ratio mode (step S8 in FIG. 6). FIG. 11 shows an example data structure of a window total appearance time array that is generated in the search processing of the ratio mode.

The search unit 15d sorts processing target event data 14a in order from the oldest to the latest according to time information (step S201). Also, the search unit 15d refers to the search conditions 14*b* and calculates a lower limit and an upper limit of a matching time range (step S202). For example, the search unit 15*d* calculates the lower limit by multiplying the sum of appearance times of all rows of the window specifying information by the time matching ratio. Also, the search unit 15*d* calculates the upper limit by dividing the sum of appearance times of all rows of the window specifying information by the time matching ratio and adding the allowed interval to the result.

Also, the search unit 15*d* generates a data structure of a window total appearance time array that has K as a length of the array corresponding to the number K of rows of the window specifying information, as shown in FIG. 11 (step S203).

Next, the search unit 15*d* repeats processing in steps S204 to S220 with respect to data in each row n (n=1 to N) of the event data 14*a* that includes N rows. First, the search unit 15*d* initializes the window total appearance time array by setting 0 (step S205). Also, the search unit 15*d* repeats processing in steps S206 to S219 with respect to a variable i (i=n to N).

That is, in processing performed in step S207, the search unit 15*d* checks whether or not a time difference from the start time point of data in the n-th row of the event data 14*a* to the start time point of data in the i-th row is no greater than the upper limit of the matching time range. If the time difference is greater than the upper limit (No in step S207), the search unit 15*d* proceeds to step S220.

If the time difference is no greater than the upper limit (Yes in step S207), the search unit 15*d* repeats processing in steps S208 to S212 with respect to information in each row k (k=1 to K) of the window specifying information including K rows.

That is, the search unit 15*d* checks whether or not information in the k-th row of the window specifying information matches data in the i-th row of the event data 14*a*, except for the appearance time (step S209). If the information matches the data (Yes in step S210), the search unit 15*d* records a total appearance time by adding the appearance time (end time point–start time point) of data in the i-th row of the event data 14*a* to the k-th element of the window total appearance time array (step S211). Note that if the information does not match the data (No in step S210), the search unit 15*d* proceeds to step S212 without performing the processing in step S211.

Then, the search unit 15*d* ends processing with respect to the information in the k-th row of the window specifying information (step S212→step S208). Upon having completed processing with respect to all rows of the window specifying information, the search unit 15*d* proceeds to step S213.

Next, the search unit 15*d* checks whether or not the time difference from the start time point of data in the n-th row of the event data 14*a* to the start time point of data in the i-th row is no smaller the lower limit of the matching time range. If the time difference is smaller than the lower limit (No in step S213), the search unit 15*d* proceeds to step S219.

If the time difference is no smaller than the lower limit (Yes in step S213), the search unit 15*d* repeats processing in steps S214 to S216 with respect to information in each row k (k=1 to K) of the window specifying information including K rows. That is, the search unit 15*d* checks whether or not the total appearance time in the k-th element of the window total appearance time array matches the appearance time of information in the k-th row of the window specifying information. At this time, the search unit 15*d* takes the time matching ratio of the search conditions 14*b* into consideration (step S215).

Then, the search unit 15*d* ends processing with respect to the information in the k-th row of the window specifying information (step S216→step S214). Upon having completed processing with respect to all rows of the window specifying information, the search unit 15*d* proceeds to step S217.

In processing performed in step S217, the search unit 15*d* checks whether or not the total appearance time matched the appearance time with respect to all values of k in the processing performed in step S215. If the total appearance time matched the appearance time (Yes in step S217), the search unit 15*d* records the start time point of data in the n-th row of the event data 14*a* and the end time point of data in the i-th row as a matched time range as shown in FIG. 9 (step S218). If the total appearance time did not match the appearance time (No in step S217), the search unit 15*d* proceeds to step S219.

The search unit 15*d* ends processing with respect to the variable i (step S219→step S206). Upon having completed processing with respect to all values of the variable i, the search unit 15*d* proceeds to step S220.

Upon having completed processing with respect to all rows of the event data (step S220→step S221), the search unit 15*d* generates search results by combining adjacent time ranges and overlapping time ranges of a plurality of matched time ranges that are recorded (step S221). Thus, a series of steps of search processing of the ratio mode is complete.

Note that similarly to the processing performed in step S119 described above, the processing performed in step S221 described above is example processing that is performed when matched ranges found through the search are collectively displayed, but the method for displaying search results is not limited to this example. For example, matched ranges found through the search may also be sequentially displayed. In this case, the search unit 15*d* sequentially outputs search results to the output unit 12 without performing the processing in step S221.

Figure 12:
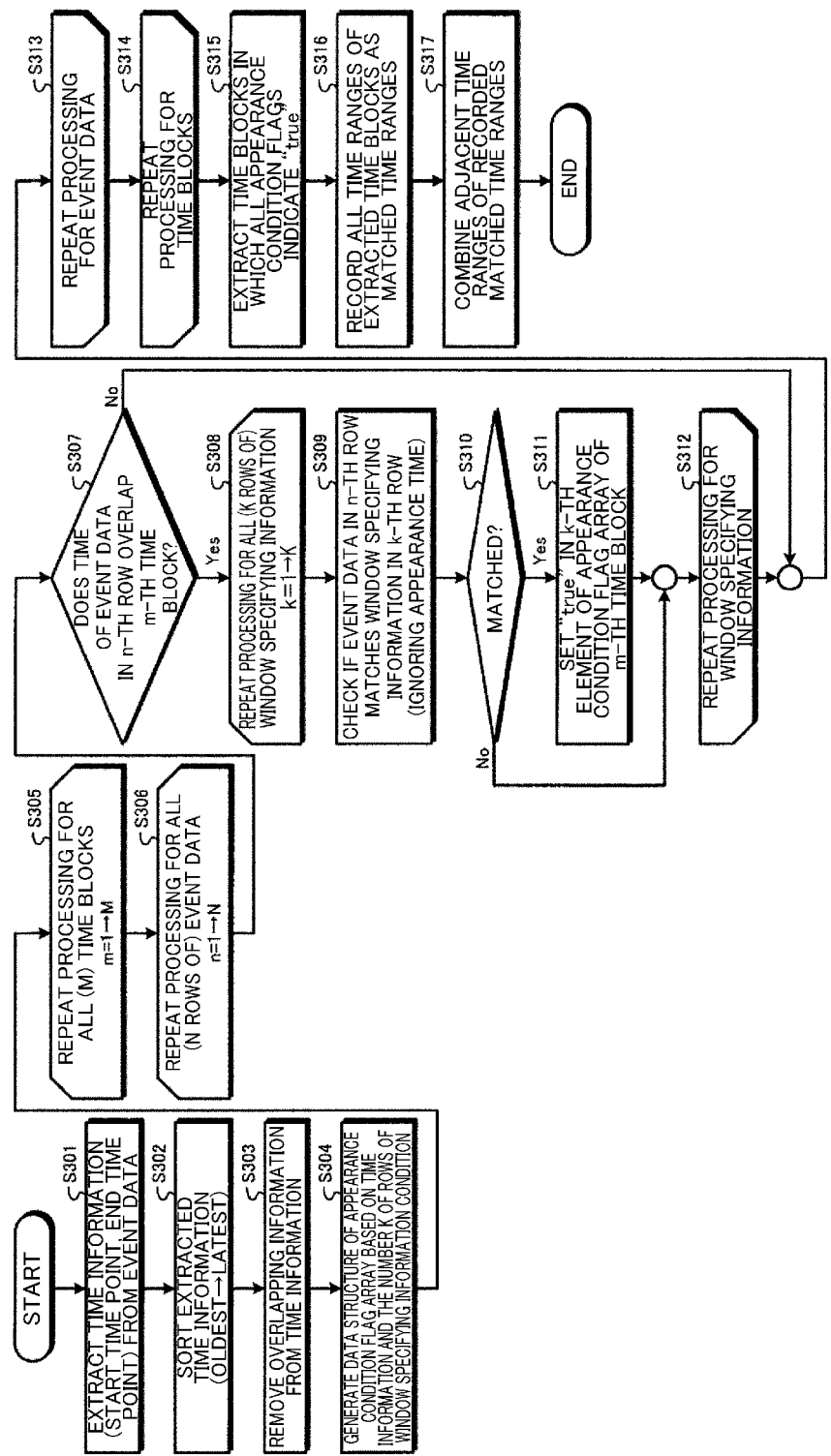
FIG. 12 is a diagram showing a search processing procedure of an existence mode.
Figure 13:
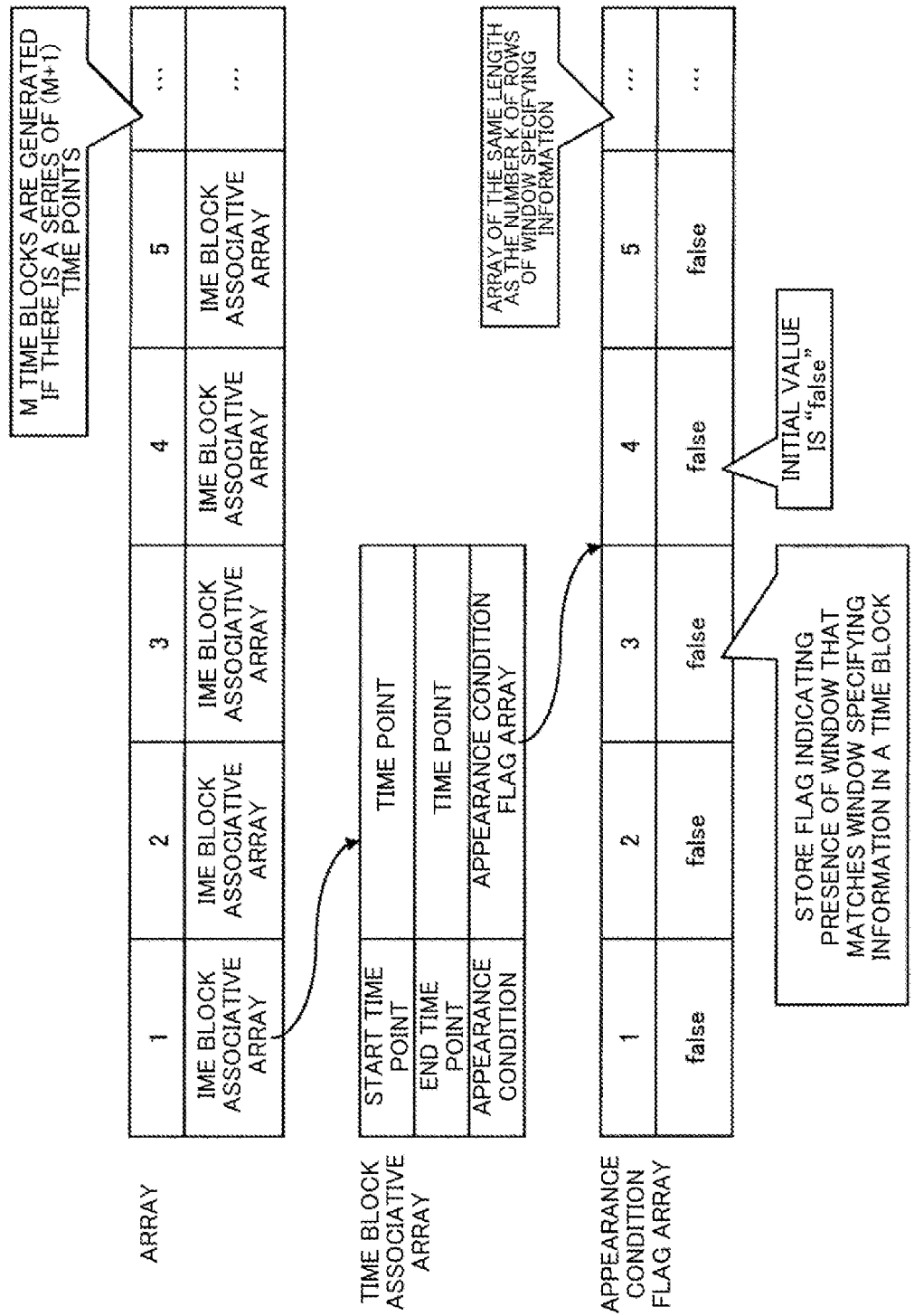
FIG. 13 is a diagram for describing search processing of the existence mode.
Figure 14:
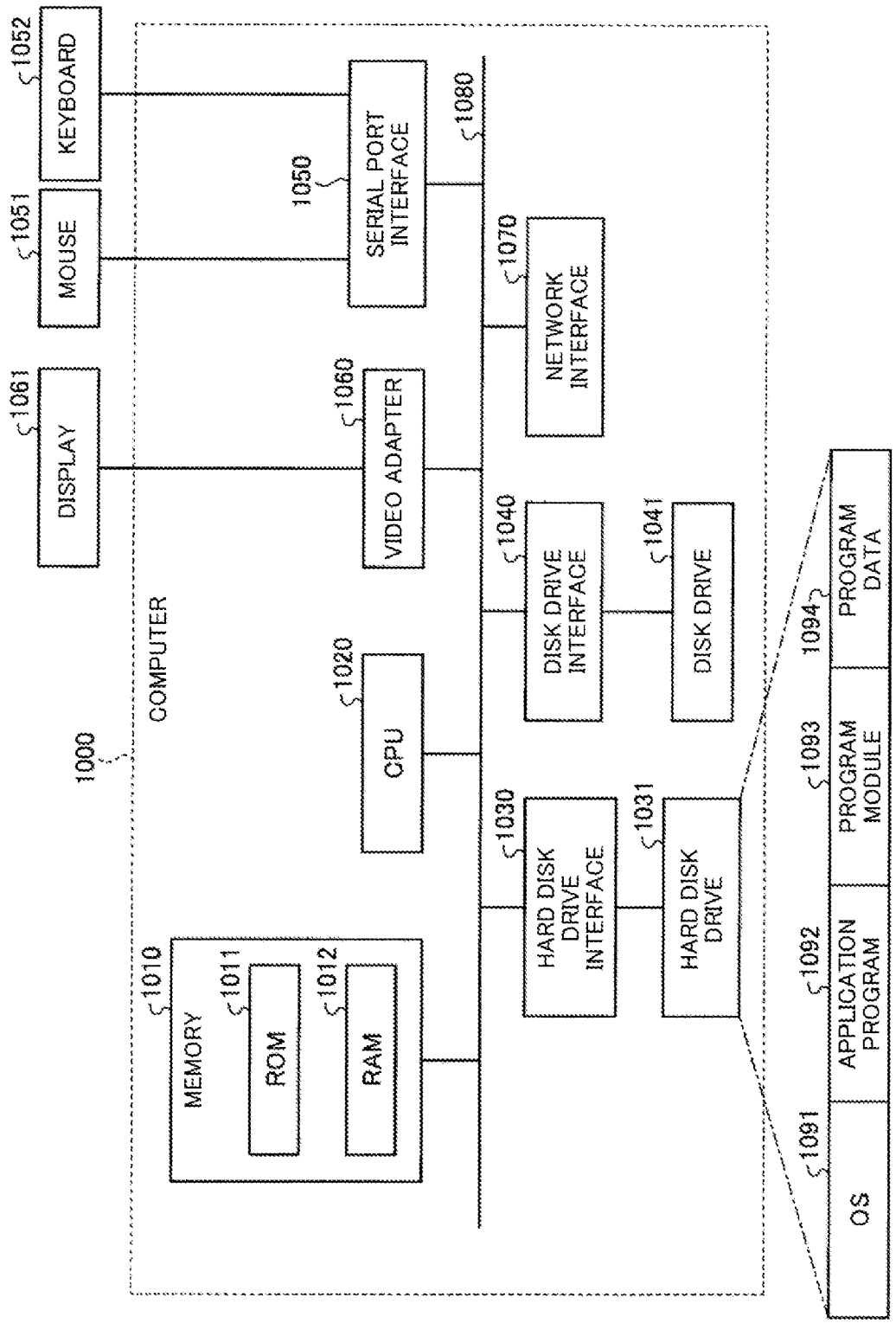
FIG. 14 is a diagram showing an example of a computer that executes a timeline display program.

FIGS. 12 and 13 are diagrams for describing search processing of the existence mode. FIG. 12 shows details of an example processing procedure of the search processing of the existence mode (step S9 in FIG. 6). FIG. 13 shows an example data structure of an appearance condition flag array that is generated in the search processing of the existence mode.

The search unit 15*d* extracts time information (start time points and end time points) from processing target event data 14*a* (step S301). Also, the search unit 15*d* sorts the time information of the event data 14*a* in order from the oldest to the latest (step S302) and removes overlapping pieces of the time information (step S303). Also, the search unit 15*d* generates a data structure of an appearance condition flag array that has K as a length of the array that corresponds to the number K of rows of the window specifying information, as shown in FIG. 13 (step S304).

Here, as shown in FIG. 13, the appearance condition flag array is expressed as an associative array that has a nested structure. That is, the appearance condition flag array is stored in a time block associative array that is stored in the m-th element (m=1 to M) of an array that has a length of M corresponding to the number M of time blocks that are periods of time between (M+1) time point information pieces. With respect to each of K types of windows that are specified in the window specifying information, the appearance condition flag array indicates "true" if there is a window that matches, and indicates "false" if there is not a window that matches, in the m-th time block.

The search unit 15d repeats processing in steps S305 to S314 with respect to the m-th time block. Also, the search unit 15d repeats processing in steps S306 to S313 with respect to data in each row n (n=1 to N) of the event data 14a including N rows.

In processing performed in step S307, the search unit 15d checks whether or not the time of data in the n-th row of the event data 14a overlaps the m-th time block (step S307). If the time does not overlap the m-th time block (No in step S307), the search unit 15d proceeds to step S313.

If the time overlaps the m-th time block (Yes in step S307), the search unit 15d repeats processing in steps S308 to S312 with respect to information in each row k (k=1 to K) of the window specifying information including K rows.

That is, the search unit 15d checks whether or not information in the k-th row of the window specifying information matches data in the n-th row of the event data 14a (step S309). At this time, the search unit 15d does not take the appearance time into consideration.

If the information matches the data (Yes in step S310), the search unit 15d sets "true" in the k-th element of the appearance condition flag array that corresponds to the m-th time block (step S311). Note that if the information does not match the data (No in step S310), the search unit 15d proceeds to step S312 without performing the processing in step S311.

Then, the search unit 15d ends processing with respect to the information in the k-th row of the window specifying information (step S312→step S308). Upon having completed processing with respect to all rows of the window specifying information, the search unit 15d proceeds to step S313.

Upon having completed processing with respect to all rows of the event data and all time blocks (step S313→step S314→step S315), the search unit 15d checks appearance condition flags and specifies time blocks that correspond to appearance condition flag arrays in which "true" is set for all windows (step S315), and records the start time point and the end time point (which are recorded in the time block associative array) of each specified time block as a matched time range as shown in FIG. 9 (step S316).

The search unit 15d generates search results by combining adjacent time ranges and overlapping time ranges of a plurality of matched time ranges that are recorded (step S317). Thus, a series of steps of search processing of the existence mode is complete.

As described above, in the timeline display device 10 according to the present embodiment, the storage unit 14 stores event data 14a for displaying a figure that represents an operation along a time axis, the event data 14a including a start time point and an end time point of the operation. The search condition acquiring unit 15c acquires a search condition 14b that specifies an appearance pattern of the figure that is displayed. The search unit 15d searches for data pieces of the event data 14a that match the acquired search condition 14b.

With this configuration, the timeline display device 10 makes it possible to easily perform quantitative evaluation of conditions of use of windows by using qualitative features that are found in a timeline display.

Also, the search condition 14b includes time matching information that specifies a range in which it is determined that an appearance time of the figure matches with the event data 14a. Also, the search condition 14b includes interval information that specifies the range of a time between a plurality of figures, the time being allowed when the figures are switched. With these configurations, the timeline display device 10 makes it possible to carry out a more effective search.

Also, the search unit 15d carries out a search according to an order in which the figure appears, a ratio of an appearance time of the figure, or a plurality of figures that appear at the same time point. With this configuration, the timeline display device 10 makes it possible to more effectively perform quantitative evaluation.

Also, the search condition acquiring unit 15c interactively accepts input of the search condition 14b from a user. This configuration enables the user to more easily perform quantitative evaluation of conditions of use of windows.

Program It is also possible to create a program that describes the processing executed by the timeline display device 10 according to the embodiment described above, using a language that enables a computer to execute the processing. In an embodiment, the timeline display device 10 can be implemented by installing, in a desired computer, a timeline display program for executing the timeline display processing described above as packaged software or online software. For example, it is possible to cause an information processing device to function as the timeline display device 10 by causing the information processing device to execute the timeline display program described above. Examples of the information processing device referred to herein include desktop personal computers and notebook personal computers. In addition, examples of the information processing device also include mobile communication terminals such as smartphones, portable phones, and PHSs (Personal Handyphone Systems) and slate terminals such as PDAs (Personal Digital Assistants). Also, the functions of the timeline display device 10 may be implemented in a cloud server.

FIG. 10 is a diagram showing an example of a computer that executes the timeline display program. The computer 1000 includes a memory 1010, a CPU 1020, a hard disk drive interface 1030, a disk drive interface 1040, a serial port interface 1050, a video adapter 1060, and a network interface 1070, for example. These units are connected to each other via a bus 1080.

The memory 1010 includes a ROM (Read Only Memory) 1011 and a RAM 1012. A boot program such as a BIOS (Basic Input Output System) is stored in the ROM 1011, for example. The hard disk drive interface 1030 is connected to a hard disk drive 1031. The disk drive interface 1040 is connected to a disk drive 1041. An attachable and detachable storage medium such as a magnetic disk or an optical disc is inserted into the disk drive 1041, for example. A mouse 1051 and a keyboard 1052 are connected to the serial port interface 1050, for example. A display 1061 is connected to the video adapter 1060, for example.

Here, an OS 1091, an application program 1092, a program module 1093, and program data 1094 are stored in the hard disk drive 1031, for example. Each type of information described in the above embodiment is stored in the hard disk drive 1031 or the memory 1010, for example.

Also, the timeline display program is stored in the hard disk drive 1031 as the program module 1093 in which commands that are executed by the computer 1000 are written, for example. Specifically, the program module 1093 in which each type of processing executed by the timeline display device 10 described in the above embodiment is described is stored in the hard disk drive 1031.

Also, data that is used in information processing performed in accordance with the timeline display program is stored as the program data 1094 in the hard disk drive 1031, for example. The CPU 1020 executes each procedure described above by reading the program module 1093 and the program data 1094 stored in the hard disk drive 1031 into the RAM 1012 as necessary.

Note that the program module 1093 and the program data 1094 relating to the timeline display program do not necessarily have to be stored in the hard disk drive 1031, and may also be stored in an attachable and detachable storage medium and read by the CPU 1020 via the disk drive 1041 or the like, for example. Alternatively, the program module 1093 and the program data 1094 relating to the timeline display program may also be stored in another computer that is connected via a network such as a LAN or a WAN (Wide Area Network), and read by the CPU 1020 via the network interface 1070.

Although the embodiment to which the invention made by the inventor is applied has been described, the present invention is not limited by the descriptions and the drawings that constitute portions of disclosure of the present invention according to the embodiment. That is, all other embodiments, examples, operation technologies, and the like that are made by, for example, those skilled in the art based on the embodiment are included in the scope of the present invention.

REFERENCE SIGNS LIST

10 Timeline display device
11 Input unit
12 Output unit
13 Communication control unit
14 Storage unit
14*a* Event data
14*b* Search conditions
15 Control unit
15*a* Information acquiring unit
15*b* Display processing unit
15*c* Search condition acquiring unit
15*d* Search unit

The invention claimed is:

1. A timeline display device comprising:
processing circuitry configured to:
for a plurality of applications on a client device:
store event data associated with a graphical user interface (GUI) that was previously displayed for an application performing an operation, wherein the event data comprises a start time and an end time of the operation; and
provide the event data to a timeline GUI, the timeline GUI configured to display the event data for the application;
receive a search condition that specifies an appearance configuration of the previously displayed GUIs;
determine, from the stored event data, one or more configurations of a subset of the previously displayed GUIs of the plurality of applications that match to the received search condition; and
provide data to the timeline GUI indicative of the one or more configurations that match to the search condition, wherein the timeline GUI is configured to display the one or more configurations overlaid on the stored event data for the plurality of applications along a time axis.

2. The timeline display device according to claim 1, wherein the search condition comprises time matching information that specifies a range in which an appearance time of the one or more configurations of the subset of the previously displayed GUIs matches with the event data.

3. The timeline display device according to claim 1, wherein the search condition comprises interval information that specifies a range of a time interval between a plurality of GUIs, the time interval being allowed when the GUIs are switched.

4. The timeline display device according to claim 1, wherein the processing circuitry is further configured to carry out perform a search according to an order in which the figure a GUI of the plurality of GUI appears, a ratio of an appearance time of the figure GUI, or a subset of a plurality of the figures GUIs that appear at a same time point.

5. The timeline display device according to claim 1, wherein the processing circuitry is further configured to interactively accept input of the search condition from a user.

6. The timeline display device of claim 1, wherein displaying the one or more configurations overlaid on the stored event data for the plurality of applications along the time axis comprises:
displaying, on the timeline GUI, the data indicative of the one or more configurations that match to the search condition, wherein the data overlaps a portion of the stored event data for the plurality of applications on the timeline GUI according to one or more specified time ranges identified in the search condition.

7. The timeline display device of claim 6, wherein the appearance configuration comprises appearance times of the previously displayed GUIs, the appearance times indicating duration of display of the previously displayed GUIs.

8. A timeline display method to be executed by a timeline display device, the timeline display method comprising:
for a plurality of applications on a client device:
storing event data associated with a graphical user interface (GUI) that was previously displayed for an application performing an operation, wherein the event data comprises a start time and an end time of the operation;
providing the event data to a timeline GUI, the timeline GUI configured to display the event data for the application;
receiving a search condition that specifies an appearance configuration of the previously displayed GUIs;
determining, from the stored event data, one or more configurations of a subset of the previously displayed GUIs of the plurality of applications that match to the received search condition; and
providing data to the timeline GUI indicative of the one or more configurations that match to the search condition, wherein the timeline GUI is configured to display the one or more configurations overlaid on the stored event data for the plurality of applications along a time axis.

9. A non-transitory computer-readable recording medium storing software comprising instructions executable by one or more computers, which, upon such execution, cause the one or more computers to perform operations comprising:
for a plurality of application on a client device:
storing event data associated with a graphical user interface (GUI) that was previously displayed for an application performing an operation, wherein the event data comprises a start time and an end time of the operation;
providing the event data to a timeline GUI, the timeline GUI configured to display the event data for the application;

receiving a search condition that specifies an appearance configuration of the previously displayed GUIs;

determining, from the stored event data, one or more configurations of a subset of the previously displayed GUIs of the plurality of applications that match to the received search condition; and providing data to the timeline GUI indicative of the one or more configurations that match to the search condition, wherein the timeline GUI is configured to display the one or more configurations overlaid on the stored event data for the plurality of applications along a time axis.

* * * * *